Patented Oct. 22, 1946

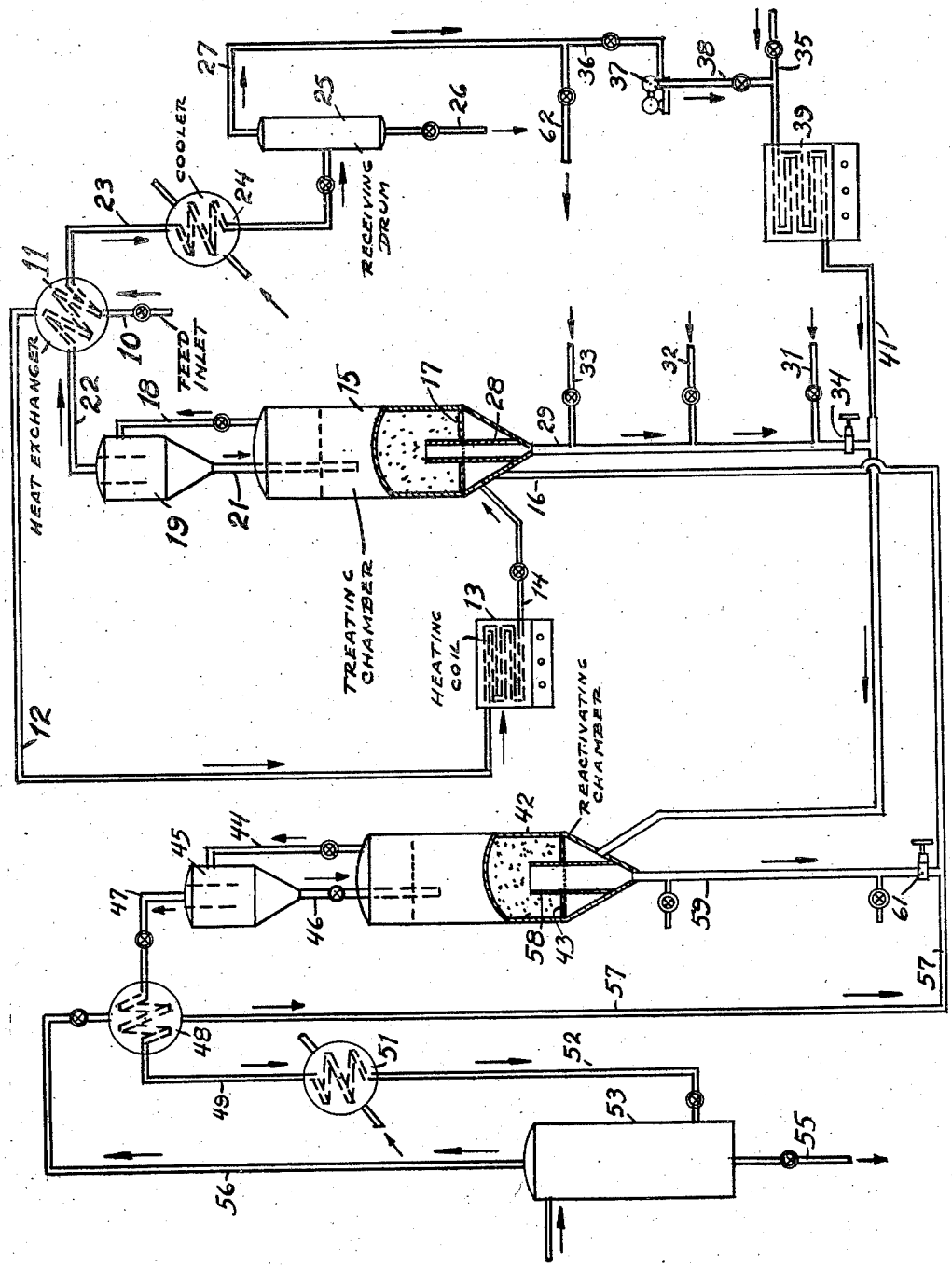

2,409,690

UNITED STATES PATENT OFFICE 2,409,690

DESULPHURIZATION OF HYDROCARBON OILS

Edward W. S. Nicholson and Aaron K. Redcay, Baton Rouge, La., assignors to Standard Oil Development Company, a corporation of Delaware Application December 10, 1943, Serial No. 513,680

6 Claims. (Cl. 196—24)

This invention relates to the refining of petroleum distillates and pertains more particularly to a method of removing sulfur constituents from said distillates.

It has been proposed heretofore to remove sulfur compounds from petroleum distillates by passing the distillates in vapor form in an atmosphere of hydrogen through a bed of desulfurizing catalyst, such as nickel, alumina, or the like.

During the course of the treatment a substantial amount of the sulfur originally contained in the distillate is deposited or absorbed on the catalyst material. This makes it necessary to interrupt the process periodically to remove the sulfur and to restore the activity of the catalyst.

The removal of the sulfur from the catalyst may be accomplished by treating the catalyst with hydrogen so as to convert the sulfur into hydrogen sulfide gas which may be subsequently recovered by passing the resulting gas through a weak alkaline solution. It has also been suggested to remove the sulfur by oxidation. When this is done, it is usually necessary to subject the catalyst to a reducing treatment before being reemployed for further sulfur removal.

One of the primary objects of the present invention is to provide an improved process for removing sulfur compounds from petroleum oils.

A further object of the invention is to provide a continuous process for removing sulfur compounds from petroleum distillates. Other more specific objects and advantages will be apparent from the detailed description of the invention appearing hereinafter.

With the above objects and advantages in view, the invention will be better understood by reference to the accompanying drawing which is a diagrammatic illustration of an apparatus suitable for carrying the invention into effect.

Referring to the drawing, reference character 10, located at the upper right hand portion of the drawing, designates a feed line through which the oil to be treated is introduced into the equipment. This oil is preferably a clean distillate stock such as a naphtha fraction, kerosene fraction, heating oil, light gas oil, or the like.

The oil introduced through line 10 is passed through a heat exchanger 11 wherein it passes in heat exchange relation with products from the process as later described. The oil after passing through the preheater 11 continues through line 12 to a furnace 13 wherein the oil is vaporized and heated to the desired reaction temperature. This temperature may, for example, be of the order from 400° to 800° F.

The oil vapors formed in the preheating and vaporizing furnace 13 continue through line 14 into the bottom portion of the treating chamber 15. A suspension of hydrogen and finely divided desulfurized catalyst is also introduced into the bottom of the treating chamber 15 through line 16 and intermingles with the oil to be treated. The treating chamber 15 is preferably provided with a perforated grid plate 17 positioned above the point of entry of oil vapors and catalyst-hydrogen suspension to distribute the resulting mixture over the reaction chamber.

A mixture of hydrogen, oil vapors, and catalyst passes upwardly through the perforated grid 17 into the main body of the treating chamber.

The velocity of the hydrogen and oil vapors passing through the treating chamber is preferably controlled to permit the catalyst to segregate into a dense turbulent layer in the bottom portion of the reaction chamber.

The catalyst employed for removing the sulfur from the oil vapors may be any known desulfurizing catalyst such as finely divided metallic nickel supported on activated alumina or other metal powders such as copper or zinc, with or without carriers. The desulfurization treatment is preferably carried out under a relatively low pressure ranging from atmospheric to 200 pounds per square inch and the temperature of the reaction zone may be between 400° and 800° F., and preferably between 600° and 700° F.

The oil vapors are retained in the treating chamber 15 in contact with the catalyst for a period controlled to remove or materially reduce the amount of sulfur compounds contained therein. The gaseous reaction products comprising the treated oil vapors and hydrogen are removed from the upper end of the treating chamber 15 through line 18 and may be passed to suitable separating device such as a cyclone separator 19 for removal of entrained powder from the reaction products. The entrained catalyst powder separated from the reaction products in separator 19 may be returned to the treating chamber through conduit 21. The vapors and gases after passing through the cyclone separator 19 are removed through line 22 and may be subjected to further treatment for removal of entrained powder, as desired. Following this, the reaction products pass through heat exchanger 11 in indirect heat exchange with fresh feed as previously described. The products then continue through line 23 to cooler 24 in which the products are cooled to a temperature sufficient to condense the oil vapors therefrom.

The products from the condenser 24 are then passed to a product receiver 25 in which the treated liquid distillate is separated from the unreacted hydrogen and other gaseous materials. The treated distillate is withdrawn from the product receiver 25 through line 26 and the gases are removed overhead from the product receiver through line 27.

The treating chamber 15 may be provided with an upwardly extending tube 28 positioned in the bottom of the chamber for continuously withdrawing catalyst from the chamber. The bottom of the tube 28 is in open communication with a vertical conduit 29 through which the catalyst is continuously withdrawn from the treating chamber and introduced into a stream of hydrogen containing gas. The vertical conduit 29 preferably forms a standpipe for generating a fluid pressure for circulating the finely divided catalyst through the treating chamber and the reactivating chamber to be later described. A small amount of an aerating gas should be maintained in admixture with the catalyst in the vertical tube 29 to maintain it in a fluid condition capable of developing a fluid pressure at the base thereof. To this end a small amount of an aerating gas may be introduced at one or more spaced points along the column through lines 31, 32 and 33.

The column 29 may be provided with a valve 34 for controlling the level of the catalytic material maintained in the treating chamber 15.

It is desirable to maintain the level of the dense layer of catalytic material in the treating chamber 15 a substantial distance below the top of the chamber in order to reduce the amount of entrained solids contained in the reaction products withdrawn through line 18.

The hydrogen-containing gas into which the catalyst from the column 29 discharges may be introduced into the system through line 35 or it may consist in whole or in part of the gases removed from the product receiver 25. In the latter case, a portion of the overhead products from the receiver 25 withdrawn through line 27 may be passed through line 36 to a compressor 37 wherein it is recompressed to the desired pressure for carrying out the reactivation of the catalyst. The compressed gas is then passed through line 38 which merges with line 35 leading to the furnace 39 in which the gas is heated to a temperature sufficient to reduce the sulfur contained on the catalyst. The heated hydrogen-containing gas after passing through the furnace 39 continues through line 41 into which the catalyst from the column 29 discharges.

The resulting suspension of hydrogen-containing gas and catalyst continues through line 41 into the bottom of a reactivating chamber 42 below a perforated grid plate 43, through which the suspension passes into the body of the reactivating chamber.

The velocity of the hydrogen-containing gas passing upwardly through the reactivating chamber 42 is also preferably controlled to permit the finely divided catalytic material to settle into a relatively dense layer in the bottom portion of the reactivating chamber.

The temperature and pressure conditions maintained in the reactivating chamber 42 may be substantially the same as those maintained in the treating chamber 15. For example, the temperature may be of the order from 400 to 800° F. and the pressure between atmospheric and 200 pounds per square inch.

It has been found that there is an equilibrium between the sulfur which remains on the catalyst and the sulfur which is removed by the gas in the reactivating chamber 42. By employing a relatively high proportion of hydrogen in comparison with the amount of sulfur contained on the catalyst the sulfur content of the catalyst may be reduced in the reactivating chamber 42 to a very low value. Gases resulting from the reactivating treatment in chamber 42 are withdrawn overhead therefrom through line 44 leading to a suitable separating device such as a cyclone separator 45 for removal of entrained catalyst therefrom and the separated catalyst may be returned to the reactivator chamber 42 through line 46. The gases after passing through the cyclone separator 45 continue through line 47 to a heat exchanger 48 in which the gases pass in heat exchange relation to treated gases as later described. The gases after passing through heat exchanger 48 are passed through line 49 to a cooler 51 in which the gases are cooled to temperature somewhat below the boiling point of water so that they may be subsequently scrubbed with a weak basic solution for the removal of hydrogen sulfide therefrom.

The sulfur bearing gases after passing through the cooler 51 continue through line 52 to a scrubbing chamber 53 in which they pass in countercurrent contact with an aqueous solution capable of absorbing or reacting with the hydrogen sulfide present in the gas. For example, monoethanolamine, diethanolamine, sodium phenolate solutions may be used for this purpose.

The scrubbing liquid is introduced into the scrubbing tower 53 through line 54 and is removed from the bottom of the tower through line 55. The sulfur-free gases consisting primarily of hydrogen are removed from the scrubbing tower 53 through line 56 having the heat exchanger 48 located therein so that the treated gases pass in heat exchange relation with the overhead products from the cyclone separator 45 as previously described.

The treated gas after passing through the heat exchanger 48 continues through line 57 and may be used as a carrier gas for returning the reactivated catalyst to the treating zone.

Returning to the reactivating chamber 42, a tubular conduit 58 may be provided in the lower portion of the chamber for collecting the reactivated catalyst. The bottom of the reactivating chamber 42 connects with a vertical pipe 59 for removing the reactivated catalyst from the reactivating chamber. The vertical pipe 59 is provided with a control valve 61 for regulating the rate of removal of the reactivated catalyst from the chamber and for controlling the time of residence of the catalyst within the chamber.

The catalyst is preferably withdrawn from the chamber 42 at a rate sufficient to maintain the level of the dense catalytic mass within the chamber a substantial distance below the gas outlet to reduce overhead entrainment as previously described in connection with the treating chamber 15.

The reactivated catalyst discharges through the control valve 61 of the pipe 59 into the gas line 57 carrying the treated gas into the treating chamber 15. Any excess gas formed in the process may be removed through the line 62 and fresh hydrogen makeup gas may be introduced through line 35 as previously mentioned. From the above description it will be noted that the invention provides a continuous process for effecting desulfurization of hydrocarbon distillates wherein the desulfurizing catalyst is continuously circulated through a treating chamber and a reactivating chamber. By controlling the rate of circulation of the catalyst through the two chambers the activity of the catalyst in the treating zone may be maintained at a higher level than in cases where catalyst is being maintained in static condition in the treating zone and subsequently regenerated in situ according to current practices. The present process also involves less degradation of the feed stock due to the fact that the activity and selectivity may be maintained at a higher level. By continuously withdrawing the catalyst from the treating chamber while the catalyst contains a relatively low concentration of sulfur substantially no carbon is formed in the process and consequently the catalyst may be readily regenerated by means of hydrogen and without the necessity of burning the carbon from the catalyst.

Having described the preferred embodiment, it will be understood that the invention embraces such other variations and modifications as come within the scope of the accompanying claims.

We claim:

1. A process for removing sulfur compounds from low boiling hydrocarbon oils which comprises continuously passing a mixture of hydrocarbon oil vapors and hydrogen through a treating zone, contacting the oil vapors within the treating zone with a desulfurizing catalyst, maintaining the vapors in contact with the catalyst for a period and at a temperature sufficient materially to reduce the amount of sulfur compounds contained in said oil but insufficient to form substantial carbon deposits on the catalyst, thereafter removing the treated vapors from the treating zone, continuously removing catalytic material from the treating zone while said material contains a relatively low concentration of sulfur, passing the catalyst so removed through a reactivating zone, treating the catalyst within the reactivating zone with a gas consisting substantially exclusively of hydrogen in an amount and at temperature sufficient to remove the sulfur from said catalyst and returning the desulfurized catalyst to the treating zone.

2. A process for removing sulfur compounds from lower boiling hydrocarbon oils which comprises passing a mixture of said oil in vapor form and hydrogen through a desulfurizing zone containing an active desulfurizing catalyst, maintaining the oil vapors in contact with the catalyst at elevated temperature for a period sufficient materially to reduce the amount of sulfur compounds contained in said vapors but insufficient to form substantial carbon deposits on the catalyst, thereafter removing the treated vapors from the desulfurizing zone, continuously removing catalyst containing sulfur from said zone while the catalyst has a relatively low concentration of sulfur, passing the sulfur containing catalyst so withdrawn into a reactivating zone, treating said catalyst within said reactivating zone with a gas consisting substantially exclusively of hydrogen, controlling the temperature and the contact time within the reactivating zone to convert the sulfur contained on said catalyst into a gaseous form, continuously removing the hydrogen containing gas containing the sulfur compounds from the reactivating zone, treating the gas so removed to remove the sulfur therefrom and thereafter returning the hydrogen containing gas to said desulfurizing zone.

3. A method of removing sulfur compounds from low boiling hydrocarbon oils which comprises passing a mixture of the oil in vapor form and hydrogen upwardly through a treating zone maintained at a desulfurizing temperature between 400 and 800° F., continuously introducing a stream of finely divided desulfurizing catalyst into the oil vapors passing through said zone, controlling the velocity of the vapors and gas passing through the treating zone to maintain a dense turbulent layer of finely divided catalytic material in the bottom portion of said treating zone, keeping said oil vapors in contact with said finely divided catalyst for a period sufficient substantially to reduce the amount of sulfur compounds contained in said vapors but insufficient to form substantial carbon deposits on the catalyst, thereafter removing the treated vapors from the treating zone, continuously removing finely divided catalytic material containing sulfur from the treating zone while the material has a relatively low concentration of sulfur, passing the material so withdrawn into a reactivating zone, passing a gas consisting substantially exclusively of hydrogen through said reactivating zone in an amount and at temperature sufficient to convert the sulfur on said catalyst into gaseous sulfur compounds, contacting the catalyst in the reactivating zone with said hydrogen containing gas for a period sufficient materially to reduce the sulfur content of the catalyst obtained therein, thereafter withdrawing the reactivated catalyst and returning the same to said first named treating zone.

4. In the process defined by claim 3, the further improvement which comprises treating the gas removed from the reactivating zone to remove the sulfur compounds therefrom and thereafter returning the same to the first named treating zone.

5. In the process defined by claim 3, the further improvement which comprises segregating a hydrogen containing gas from the treated oil vapors removed from the treating zone and passing the hydrogen containing gas so segregated through said reactivating zone.

6. A continuous method of reactivating a desulfurizing catalyst used for the desulfurization of petroleum distillates which has become contaminated in a treating zone with sulfur deposits but is substantially free from carbon deposits, which comprises continuously removing the catalyst containing sulfur deposits from the treating zone, passing the catalyst so withdrawn into a reactivating zone, treating the catalyst within the reactivating zone with a gas consisting substantially exclusively of hydrogen, said gas being present in an amount and at a temperature sufficient to remove the sulfur deposits from said catalyst, and returning the reactivated catalyst to the treating zone.

EDWARD W. S. NICHOLSON.
AARON K. REDCAY.